May 13, 1924.
A. P. ABBOTT
BALING PRESS
Filed Feb. 8, 1923
1,493,946
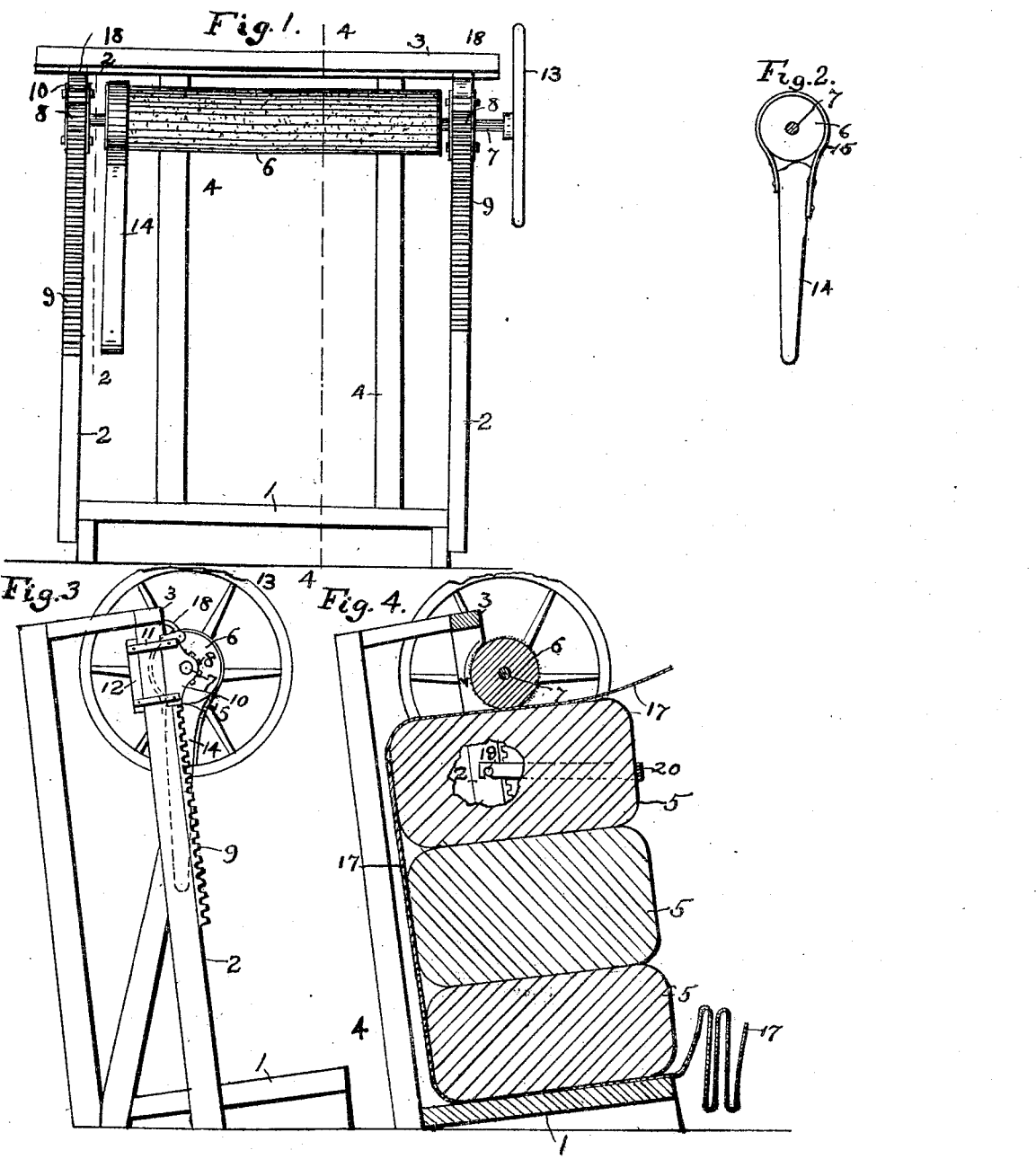
Inventor:
Arthur P. Abbott
by S. W. Bates
Atty.

Patented May 13, 1924.

1,493,946

UNITED STATES PATENT OFFICE.

ARTHUR P. ABBOTT, OF DEXTER, MAINE.

BALING PRESS.

Application filed February 8, 1923. Serial No. 617,699.

*To all whom it may concern:*

Be it known that I, ARTHUR P. ABBOTT, a citizen of the United States, residing at Dexter, in the county of Penobscot and State of Maine, have invented certain new and useful Improvements in Baling Presses, of which the following is a specification.

My invention relates to baling presses particularly for forming bales of woven fabrics which are wrapped in burlap or other like covering material.

It is common practice, particularly since the war when wooden packing cases became very expensive, to form bales of a plurality of pieces of cloth frequently three in number pressing them together under a suitable baling press and sewing around the several pieces a piece of burlap to form the bale with an outside covering of burlap. As this operation has been performed, the piece of burlap of the desired size was wrapped about the bale, the ends overlapped and the cover stitched on by the use of an upholsterer's needle and strong twine, the burlap being folded to form the necessary seams whereby the bale would be entirely enclosed on all sides by the burlap. There was no way of stretching the burlap covering and holding it in place by the necessary stitches and the only means of drawing the covering taut was by the drawing action of the sewing twine as the cover was sewed in place over the bale. Bales made up in this way were loose and slack inside the burlap covering; they were comparatively difficult to handle and there was a waste of that portion of the burlap of the covering which was embodied in the wrinkles and slack places.

According to my invention, I construct a baling press in which the strip of burlap long enough to pass around the entire bale is inserted before the several pieces of the cloth are compressed together to form the bale with means for drawing the burlap tightly around the bale, leaving two opposing free ends in such a position that they may be stitched together and drawn sufficiently tight by the sewing twine to form a bale which when released from the press will have a tightly fitting cover and will be capable of being readily handled and packed.

The invention consists essentially of a pressure roll having a roughened surface with means for forcing the roll down upon the pieces of cloth to compress then into a solid body with a strip of burlap interposed between the pressure roll and the cloth.

Means are provided for rotating the roll so that the latter will draw the burlap along the surface of the cloth while the same is under high compression, thus stretching the burlap taut on the back side between the base of the bale and the upper surface by the action of the roughened roll. This operation puts sufficient pressure on the body of the bale so that when the burlap covering is stitched up in front in the ordinary way, the bale will expand slightly, draw the stitches tightly and become a perfectly compact, firmly enclosed bale of cloth.

The strip of burlap is enabled to slide freely forward in contact with the material beneath as it is always customary to wrap the cloth in smooth paper before covering it with burlap.

A bale of goods made up on my baling press uses 5% less burlap than when wrapped in the old way and it produces a highly compressed easily handled bale superior in every way to the bale made by the old system.

I have illustrated in the accompanying drawing a baling press constructed in accordance with my invention and built particularly for forming bales of men's heavy overcoating.

Referring to the drawing:

Fig. 1 is a front elevation of the press,

Fig. 2 is a section taken on the line 2—2 of Fig. 1,

Fig. 3 is a side elevation and,

Fig. 4 is a section taken on the line 4—4 of Fig. 1.

Referring to the drawing, 1 represents the base of the press and 2—2 are the side uprights which support the cap piece 3 at the top of the press.

The base 1 is large enough in area so that the pieces of cloth to be baled may be piled on it between the uprights 2—2.

The uprights 2—2 are set at a slight inclination rearwardly and additional uprights 4—4 connect the cap piece 3 with the base 1 to form a rear support for the bale as it is being formed. 5—5 represents the pieces of the cloth as they are piled on the base 1 to be formed into a bale. The cloth pieces 5 are pressed together to form the completed bale by a pressure roller 6 having a roughened exterior surface and mounted loosely on a shaft 7. Keyed to the shaft 7 near each end are a pair of pinions 8, one at each side of the press adapted to engage the teeth of a rack 9 which is secured to the front surface of the upright 2. A bearing is formed for the shaft 7 adjacent to each of the pinions 8, this bearing being composed of two side pieces 10 with straps 11 connecting with the block 12 which is adapted to slide longitudinally along the rear surface of the upright 2.

As will be seen, the construction is such that as the shaft 7 is rotated, the two pinions 8—8 will travel on the rack 9, the pinions 8 being held in contact with the face of the rack 9 by the action of the block 12. The hand wheel 13 of relatively large diameter is secured to one end of the shaft 7 for rotating the pinions 8 and lifting or depressing the roll 6 to compress the goods. The amount of compression applied will vary according to the size of the hand wheel and the size of the pinion.

Means are provided for rotating the roll 6 on the shaft 7 for the purpose of tightening the burlap as hereafter explained. Around one end of the roll 7 as here shown, is a strap 15 of which the ends are secured to the upper end of a tightening lever 16 which is suspended normally by the strap from the end of the roll.

The connection between the lever 14 and the roll 7 is such that when the lever is swung toward the front of the press, the lever 14 is made to pinch the end of the roll and to rotate the same in the direction shown by the arrow in Fig. 4.

It is evident that different mechanical devices may, if desired, be made for the purpose of rotating the roll but the lever here shown is practical and simple for the purpose.

The surface of the roll is covered with sand paper or suitably roughened in some other manner so that it will take a frictional hold on the surface of the burlap when it comes in contact with the latter.

A pawl 18 is pivoted on the upper end of each of the bearings 10 and is designed to engage the teeth of the rack 9.

Means are also provided to hold the upper piece of cloth against horizontal movement in a forward direction and as here shown, I provide a strap 20 which is secured on each side to a pin 19 on the upright 2, passing around the front portion of the upper piece of cloth and holding it firmly from horizontal movement towards the front.

The operation of the press is as follows:—

The pieces of cloth are piled on the base 1. In the present case, I show three pieces as in Fig. 4 piled on the base of the press. A strip of burlap 17 is first laid on the base, brought up around the rear and then forward over the top of the upper piece. Preferably, the free end projects out in front of the top of the bale a relatively short distance, the free end at the bottom on which the bale rests being left long enough to reach to the top and allow sufficient burlap for making the necessary seam at the forward upper edge.

The hand wheel 13 is now turned and the pinions are rolled down the rack 9 carrying the roll 6 bodily with them and compressing the cloth somewhat more than it will be compressed when it is finally released from the press.

The bale having been compressed downward by the roll 6 and the strap 20 being placed in position to hold the upper piece from sliding, the hand lever 14 is now brought into operation and the roll 7 is rotated in the direction of the arrow in Fig. 4.

The effect of this rotation of the roll 6 is to draw the upper end of the strip of burlap forward along the upper piece of cloth, stretching the rear portion upward and along the back of the bale unilt it becomes very taut.

Having now compressed the cloth and drawn the burlap taut around the rear portion of the bale, the forward portion of the bale is enclosed by joining the loose ends, folding them properly and sewing them together by the aid of a suitable needle and sewing twine.

The burlap over the front of the bale uniting the top and bottom portions is sewn as closely as may be by stitches drawn together by hand but these sewed seams will not be when sewed up by hand and before the roll 7 is released as taut as the portion of burlap extending up in the rear of the bale.

When this operation is completed, the pawl 18 is released and the roll 6 allowed to rise, letting the body of the cloth in the bale expand somewhat. This expansion of the bale will allow the tension on the front portion and the rear portion of the bale to become equalized by drawing the slack over the upper end of the bale but it will be found to be drawn very taut all the way around.

The bale may now be removed from the press and the sides of the strip of burlap folded in around the ends of the bale and formed into suitable seams by the use of the needle and twine.

This operation being completed, the bale is ready to be shipped or otherwise disposed of.

It is evident that many equivalent mechanical devices may be constructed to perform the various functions necessary to the operation of my baling press.

While I have described the surface of the roll as being roughened by sand paper it is evident that any formation of this surface which will form a frictional contact with the burlap and slide it along the surface of the cloth over which the burlap is being stretched will answer the purpose of my invention.

I claim:—

1. A baling press for covered bales including a roll having a roughened surface, said roll being held and arranged to exert pressure on the bale and means for rotating said roll while in contact with the bale for tightening the covering.

2. A baling press for forming covered bales including a roll having roughened exterior surfaces, a shaft for said roll, means applied to said shaft for forcing said roll into contact with the bale and means for turning said roll on said shaft while in contact with the covering for tightening the same.

3. A baling press for forming covered bales including a pair of standards, racks thereon, a shaft having a pair of pinions each engaging one of said racks, a roll having a roughened surface loosely mounted on said shaft, bearings for said shaft slidable on said standards, a pawl on each of said bearings for engaging the teeth of said racks and means for rotating said roll on its shaft and for rotating said shaft in its bearings.

4. A baling press for forming covered bales including a pair of standards, racks thereon, a shaft having a pair of pinions each engaging one of said racks, a roll having a roughened surface loosely mounted on said shaft, bearings for said shaft slidable on said standards, a pawl on each of said bearings for engaging the teeth of said racks, a strap connected with the body of said press for preventing longitudinal motion of the material of the bale when caused by the rotation of the roll and means for rotating said roll on its shaft and for rotating said shaft in its bearings.

5. A baling press for forming covered bales including a pair of standards, racks thereon, a shaft having a pair of pinions each engaging one of said racks, a roll having a roughened surface loosely mounted on said shaft, bearings for said shaft slidable on said standards, a pawl on each of said bearings for engaging the teeth of said racks, a strap connected with the said standards for preventing the spreading of the bale when caused by the rotation of the roll and a lever for rotating said roll on its shaft and for rotating said shaft in its bearings.

6. In a baling press for forming covered bales, the combination of a compressing member for compressing the bale, means for drawing the covering material between the compressing member and the bale to tighten the cover and means for holding the material of the bale from movement with the cover.

ARTHUR P. ABBOTT.